No. 855,505.
PATENTED JUNE 4, 1907.
J. N. DOSS.
HORSESHOE NAIL CLENCHER.
APPLICATION FILED JUNE 8, 1906.
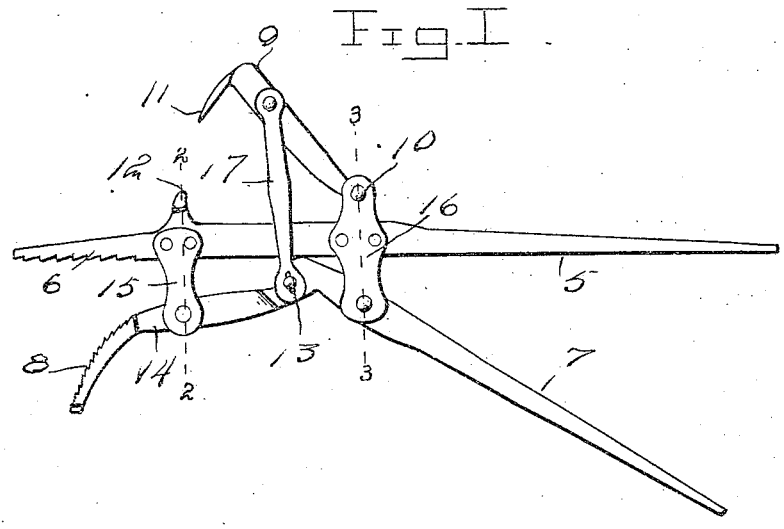
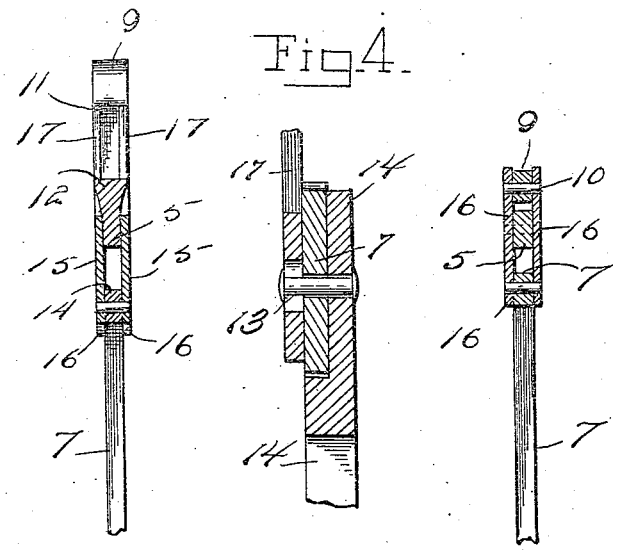
Witnesses
Inventor
John N. Doss.
By
Attorneys.

UNITED STATES PATENT OFFICE.

JOHN N. DOSS, OF WINGATE, INDIANA.

HORSESHOE-NAIL CLENCHER.

No. 855,505.  Specification of Letters Patent.  Patented June 4, 1907.

Application filed June 8, 1906. Serial No. 320,803.

*To all whom it may concern:*

Be it known that I, JOHN N. DOSS, a citizen of the United States, residing at Wingate, in the county of Montgomery, State of Indiana, have invented certain new and useful Improvements in Horseshoe-Nail Clenchers; and I do hereby declare the following to be a full, clear, and exact description of the invention, such as will enable others skilled in the art to which it appertains to make and use the same.

This invention has relation to means for shoeing horses, being a device for trimming the hoofs and clenching the nails after the latter have been driven to secure the shoe on the horse's foot.

It is the purpose of the invention to provide improvements in a tool of the kind mentioned that, with relatively short handles or legs, may operate the jaws and nippers with powerful force which is necessary to render the tool effective in the performance of its functions.

The nature of the invention is fully and clearly shown in the annexed drawings forming a part of this specification. I will therefore proceed at once to describe the invention in detail, in view of the drawings, particularly pointing out the parts or improvements constituting the invention in the subjoined claims.

Of the said drawings, to which reference is to be had, Figure 1 is a side elevation of the tool. Fig. 2 is a section on line 2—2 of Fig. 1. Fig. 3 is a section on line 3—3 of Fig. 1. Fig. 4 is a detail sectional view showing the joined connection of one of the handles with the movable drawing lever.

Similar figures of reference designate similar parts or features, as the case may be, wherever they occur.

The device embodies three major elements, namely, a straight handle or leg 5 provided with a straight jaw 6, a jointed handle or leg 7 provided with a curved jaw 8, and a cutting nipper 9 having a straight shank pivoted at its outer end to the upper or outer end of a support 16 and provided on its other end with an angular cutter 11 adapted to co-operate with a stud 12 on the upper side of the straight handle 5.

The trimming of the hoof of a horse, or nipping off of parts thereof in the process of shoeing and the clenching of the nails are so closely connected that it is extremely handy to have a single tool capable of performing these two functions, and while the nail clenchers and nippers are used in the same way in doing some things in each job of shoeing, there are frequent exigencies that arise in the work which are met by the rise of the tool in a new or entirely different way. Generally, however, the straight jaw 6 is made to engage the head of the nail below the shoe, while the curved jaw engages the point of said nail above the hoof and, by the serrations on its face, turns it down, forming a perfect clench without driving or pushing it back through the hoof and shoe, after which the turned-down point is cut off with a pair of metal-cutting nippers.

Oftentimes portions of the edge of the hoof that are not only tough but extremely hard require to be removed before a suitable basis can be provided for the shoe by paring the hoof, and these hard edges are cut off in relatively small pieces by nippers. Both of the operations mentioned require quite powerful operation of the jaws to effect the result, and in order to accomplish this without lengthening the handles to an extent that would make the implement clumsy and quite unusable, I form the handle or member 7 with a joint 13 a short distance back of the jaw 8 and pivot the part 14 bearing the curved jaw 8 at its rear end on the joint pivot fulcruming it between the lower ends of a double or split pendent supporting piece 15, fixed at its upper ends on the member 5 so that the part 14 with the handle 7 forms a compound lever and the jaw 8 is closed toward or on the jaw 6 with powerful force by moving the leg or handle 7 against or toward the handle 5. The same thing is accomplished in closing the nipper 11 on the cutting stud 12, by pivoting its rear end at 10 on the fixed support 16 secured to the handle 5 and projecting above and below the same, and also pivoting the support 17 at its upper end to the arm of the nipper 9 back of its cutting jaw 11, the lower end of the said support 17 being pivoted on the jointing pin at 13 of the handle 7. The holes formed through the parts through which the pivot pin 13 passes are somewhat enlarged to give slight play to said parts 7 and 14 in order that their outer ends may, in their movements, describe a short arc of a circle as it is necessary they should.

It is to be noted that changes may be made in the form and arrangement of parts constituting the invention, within the scope of mechanical skill, without departing from the general nature or spirit of the invention.

What is claimed as the invention is:—

1. In a horse-shoeing implement, the combination with a straight handle provided with a cutting stud, of the jointed handle, a support fixed upon the straight handle, a nipper lever pivoted at its rear on the upper end of the fixed support and having its cutter adapted to co-operate with the cutting stud, the jointed handle being pivoted on the lower end of the fixed support, and a support pivoted at its lower end on the jointing pin of the jointed handle and at its upper end to the nipper lever.

2. In a horse-shoeing implement, the combination with the straight handle having a straight jaw, of the jointed handle having a curved jaw, a support fixed to the straight handle and having a part extending above the same and a pendent part extending below the same, the jointed handle to the rear of its joint being pivoted on the pendent part of the support, a pendent piece fixed to the straight handle, the part of the jointed handle forward of its joint being fulcrumed on the lower end of said pendent piece, a cutting stud on the straight handle, a nipper lever pivoted at its rear end on the upper end of the fixed support and having its cutter adapted to co-operate with the cutting stud, and a support pivoted at its lower end on the pivot-pin of the jointed handle and at its upper end pivoted to the nipper lever.

In testimony whereof, I affix my signature, in presence of two witnesses.

JOHN N. DOSS.

Witnesses:
C. V. GRENARD,
JAMES OXLEY.